(12) United States Patent
Ishimura et al.

(10) Patent No.: US 11,414,123 B2
(45) Date of Patent: Aug. 16, 2022

(54) STEERING CONTROL DEVICE AND POWER STEERING DEVICE

(71) Applicant: Nidec Corporation, Kyoto (JP)

(72) Inventors: Hiroyuki Ishimura, Kawasaki (JP); Shuji Endo, Kyoto (JP); Hanyu Sun, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 383 days.

(21) Appl. No.: 16/585,082

(22) Filed: Sep. 27, 2019

(65) Prior Publication Data

US 2020/0102003 A1 Apr. 2, 2020

(30) Foreign Application Priority Data

Sep. 28, 2018 (JP) .............................. JP2018-185535

(51) Int. Cl.
| | |
|---|---|
| *B62D 5/00* | (2006.01) |
| *B62D 6/04* | (2006.01) |
| *B62D 6/00* | (2006.01) |
| *B62D 5/04* | (2006.01) |
| *B62D 15/02* | (2006.01) |

(52) U.S. Cl.
CPC ......... *B62D 5/0463* (2013.01); *B62D 5/0409* (2013.01); *B62D 6/008* (2013.01); *B62D 15/021* (2013.01)

(58) Field of Classification Search
None
See application file for complete search history.

(56) References Cited

U.S. PATENT DOCUMENTS

| | | | |
|---|---|---|---|
| 8,271,163 | B2 | 9/2012 | Oblizajek et al. |
| 2010/0004824 | A1 | 1/2010 | Ikeda et al. |
| 2010/0228441 | A1 | 9/2010 | Watanabe et al. |

FOREIGN PATENT DOCUMENTS

| | | | | |
|---|---|---|---|---|
| DE | 10 2010 015 857 A1 | 12/2010 | | |
| DE | 10 2010 046 072 A1 | 4/2011 | | |
| JP | 2010-012933 A | 1/2010 | | |
| JP | 2010012933 A | * 1/2010 | ........... | B62D 5/0463 |
| JP | 2014-162321 A | 9/2014 | | |

* cited by examiner

*Primary Examiner* — Adam D Tissot
*Assistant Examiner* — Laura E Linhardt
(74) *Attorney, Agent, or Firm* — Keating & Bennett

(57) ABSTRACT

A steering control device for controlling a rotation angle of a motor that drives a steering mechanism according to a rotation angle of a steering wheel, includes a torque controller to control torque of the motor with the rotation angle of the steering wheel as a command value, and a phase advance processor to perform feedback control on the torque of the motor with at least one of the rotation angle and angular velocity of the motor as a command value, and advance a phase of a signal waveform to be fed back for a partial frequency range that includes a resonance frequency of the motor and the steering mechanism in an entire frequency range.

4 Claims, 3 Drawing Sheets

STEERING CONTROL DEVICE AND POWER STEERING DEVICE

CROSS REFERENCE TO RELATED APPLICATION

The present invention claims priority under 35 U.S.C. § 119 to Japanese Application No. 2018-185535 filed on Sep. 28, 2018, the entire contents of which are hereby incorporated herein by reference.

1. FIELD OF THE INVENTION

The present invention relates to a steering control device and a power steering device.

2. BACKGROUND

As steering control (assist control) of an electric power steering device, a conventional control technology for stabilizing a resonance mode has been known.

For example, a structure in which a stabilization control means is added to an assist control means to attempt viscous damping. In the above structure, torque feedback control is performed using steering torque detected by a torque sensor.

By performing the torque feedback, followability to target torque is affected by loss torque and a torque ripple of a motor, and the above-mentioned characteristic is improvable by further adding steering angle control.

Unfortunately, since mere angular velocity feedback acts over an entire frequency range, the viscous damping is also imparted to a steering characteristic, so that the viscous damping is not efficiently applicable.

SUMMARY

An aspect of a steering control device according to an example embodiment of the present disclosure, in the steering control device for controlling a rotation angle of a motor that drives a steering mechanism according to a rotation angle of a steering wheel, includes a torque controller to control torque of the motor with the rotation angle of the steering wheel as a command value, and a phase advance processor to perform feedback control on the torque of the motor with at least one of the rotation angle and angular velocity of the motor as a command value, and advance a phase of a signal waveform to be fed back for a partial frequency range that includes a resonance frequency of the motor and the steering mechanism in an entire frequency range.

An aspect of a power steering device according to an example embodiment of the present disclosure includes the steering control device, a motor controlled by the steering control device, and a steering mechanism driven by the motor.

The above and other elements, features, steps, characteristics and advantages of the present disclosure will become more apparent from the following detailed description of the example embodiments with reference to the attached drawings.

DETAILED DESCRIPTION

Example embodiments of steering control devices and power steering devices according to example embodiments of the present disclosure will be described with reference to the attached drawings hereinafter. In order to avoid an unnecessarily redundant following description and facilitate understanding of the person skilled in the art, an unnecessarily detailed description may be omitted. For example, a detailed description of already well-known matters and a redundant description of substantially the same configuration may be omitted.

Figure 1:
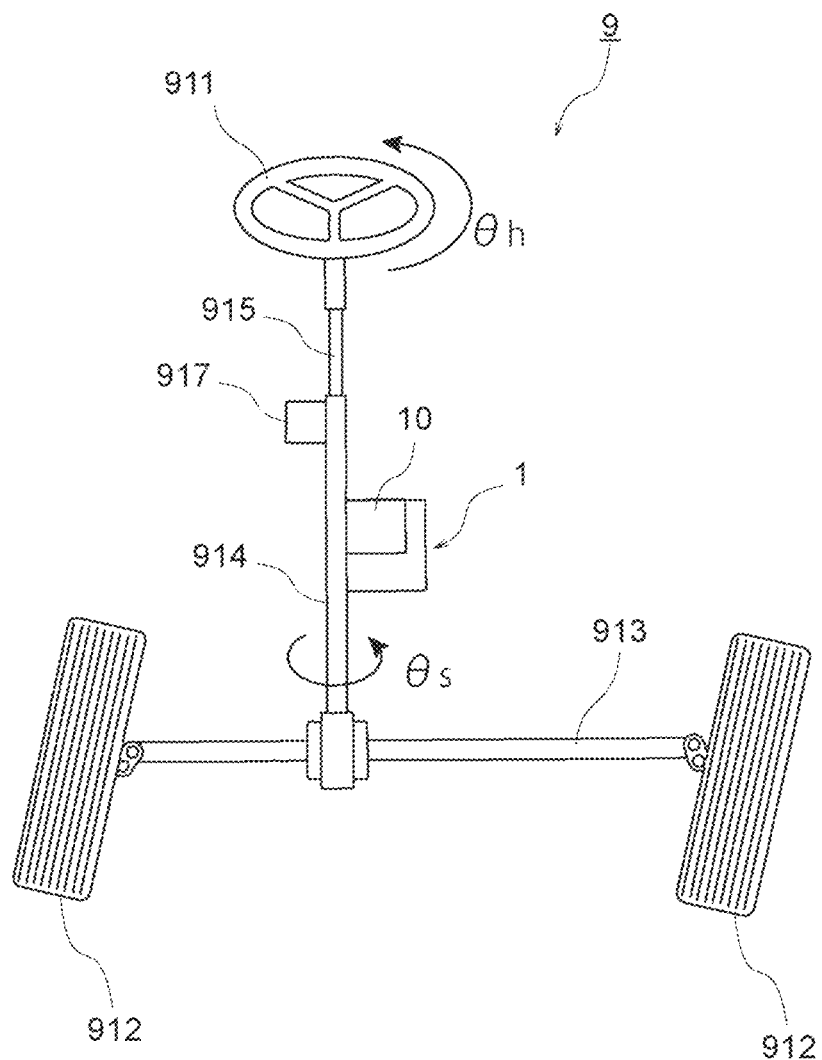
FIG. 1 is a schematic view illustrating an example embodiment of a power steering device according to the present disclosure.

FIG. 1 is a schematic view illustrating an example embodiment of a power steering device of the present disclosure.

As shown in FIG. 1, in the present example embodiment, a column-type electric power steering device is exemplified. An electric power steering device 9 is mounted on a steering mechanism of wheels of a car. The electric power steering device 9 is the column-type power steering device that directly reduces steering force by power of a steering control device 1 into which a motor 10 is built. The electric power steering device 9 includes the steering control device 1, a steering shaft 914, and an axle 913.

The steering shaft 914 transmits input torque transmitted from a steering wheel 911 via a torsion bar 915 to the axle 913 having wheels 912. When the steering wheel 911 is operated, a steerage angle θh is generated, and the torsion bar 915 is twisted to generate steering torque. The steering torque is transmitted from the torsion bar 915 to a steering mechanism including the wheels 912, the axle 913, and the steering shaft 914.

The power of the steering control device 1 is transmitted to the steering shaft 914 via gears or the like. The motor 10 used in the column-type electric power steering device 9 is provided inside an engine room (not shown). Although the electric power steering device 9 shown in FIG. 1 is of the column-type as an example, the power steering device of the present disclosure may be of a rack-type. The steering control device 1 controls a rotation angle of the motor 10 driving the steering mechanism according to a rotation angle of the steering wheel 911.

The torque transmitted from the torsion bar 915 to the steering shaft 914 is detected by a torque sensor 917. A value detected by the torque sensor 917 is input into the steering control device 1 and used to calculate a target output of the steering control device 1.

A rotation shaft (output shaft) of the motor 10 and the steering shaft 914 are mutually connected via a reduction gear and the like. Thus, the motor 10 and the steering shaft 914 always rotate together regardless of whether the torque for rotating the steering shaft 914 is torque by the motor 10 or another torque. Therefore, a steering angle θs is calculated from the number of rotations of the motor 10 based on a gear ratio and the like. The steering angle θs calculated in this manner is also used to calculate the target output in the steering control device 1.

The steering torque transmitted from the steering wheel 911 via the torsion bar 915 and assist torque by the power of the steering control device 1 are applied to the steering shaft 914 to generate the steering angle θs that is a rotation angle of the steering shaft 914.

Figure 2:
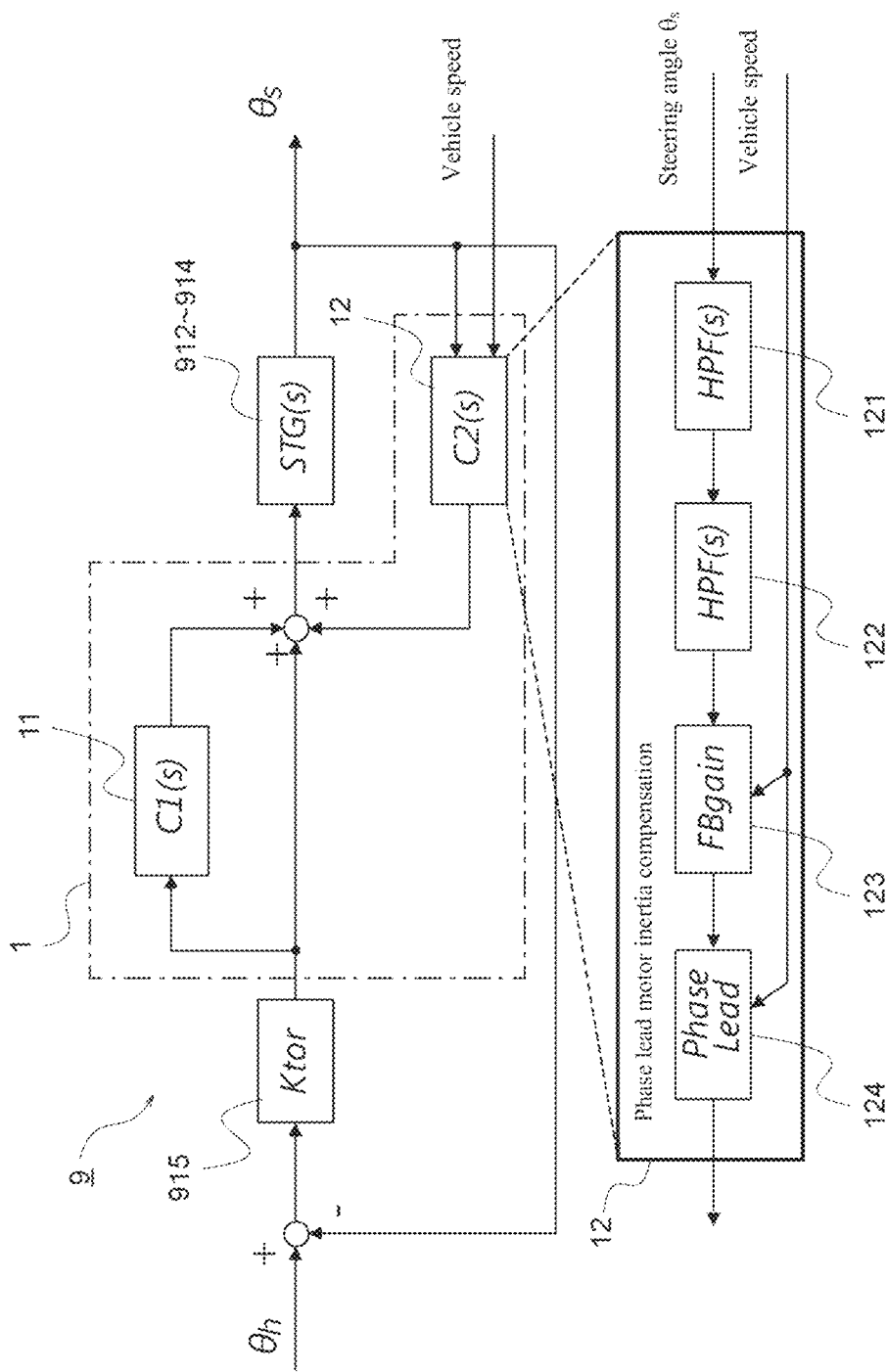
FIG. 2 is a block diagram illustrating a configuration of an electric power steering device.

FIG. 2 is a block diagram illustrating a configuration of the electric power steering device 9.

In FIG. 2, θh represents the steerage angle, θs represents the steering angle, $K_{tor}$ represents a torsion coefficient of the torsion bar 915, and STG(s) represents a steering characteristic.

A difference between the steerage angle θh of the steering wheel 911 and the steering angle θs twists the torsion bar 915 to generate the torque. The torque generated in the torsion bar 915 is detected by the torque sensor 917 and input into the steering control device 1.

The steering control device 1 includes a first control unit 11 and a second control unit 12. Blocks of these control units 11, 12 represent a function combining calculation of a control signal input into the motor 10 and the output of the motor 10 according to the control signal.

The first control unit 11 performs feedback control based on the value of torque detected by the torque sensor 917. By causing the motor 10 to generate assist torque based on the detected value of torque, the torque of the torsion bar 915 is reduced. As a result, operating force for operating the steering wheel 911 is reduced.

As the feedback control for generating the assist torque, feedback control for reducing the difference between the steerage angle θh and the steering angle θs (steering angle control) may be used as well as the feedback control for reducing the torque (torque control) as described above. When this steering angle control is used, an angle sensor for detecting the steerage angle θh of the steering wheel 911 is provided, and a value detected by the angle sensor is input into the first control unit 11. The first control unit 11 controls the torque of the motor 10 with the rotation angle (steerage angle θh) of the steering wheel as a command value.

The second control unit 12 controls a torque component that attenuates a resonance state in two-inertia system (the steering wheel 911 and the steering mechanism) connected by the torsion bar 915. The steering angle θs and a vehicle speed are input into the second control unit 12, and a torque corresponding to viscous damping is output.

The second control unit 12 includes two-stage high pass filters 121, 122, a feedback gain calculation unit 123, and a phase advance processing unit 124. The steering angle θs is input into the two-stage high pass filters 121, 122, and two-stage filter processing is performed. Such filter processing corresponds to a second derivative of the steering angle θs, and angular acceleration is calculated as a result of the filter processing.

A gain value for the angular acceleration is calculated by the feedback gain calculation unit 123, and the angular acceleration is multiplied by the gain value to obtain a compensation value for compensating for inertia of the motor 10. As described above, the feedback gain calculation unit 123 performs feedback control of the angular acceleration. Further, the vehicle speed is input into the feedback gain calculation unit 123, and the gain value is increased or decreased according to the vehicle speed.

An effect of inertia compensation will be described.

Figure 3:
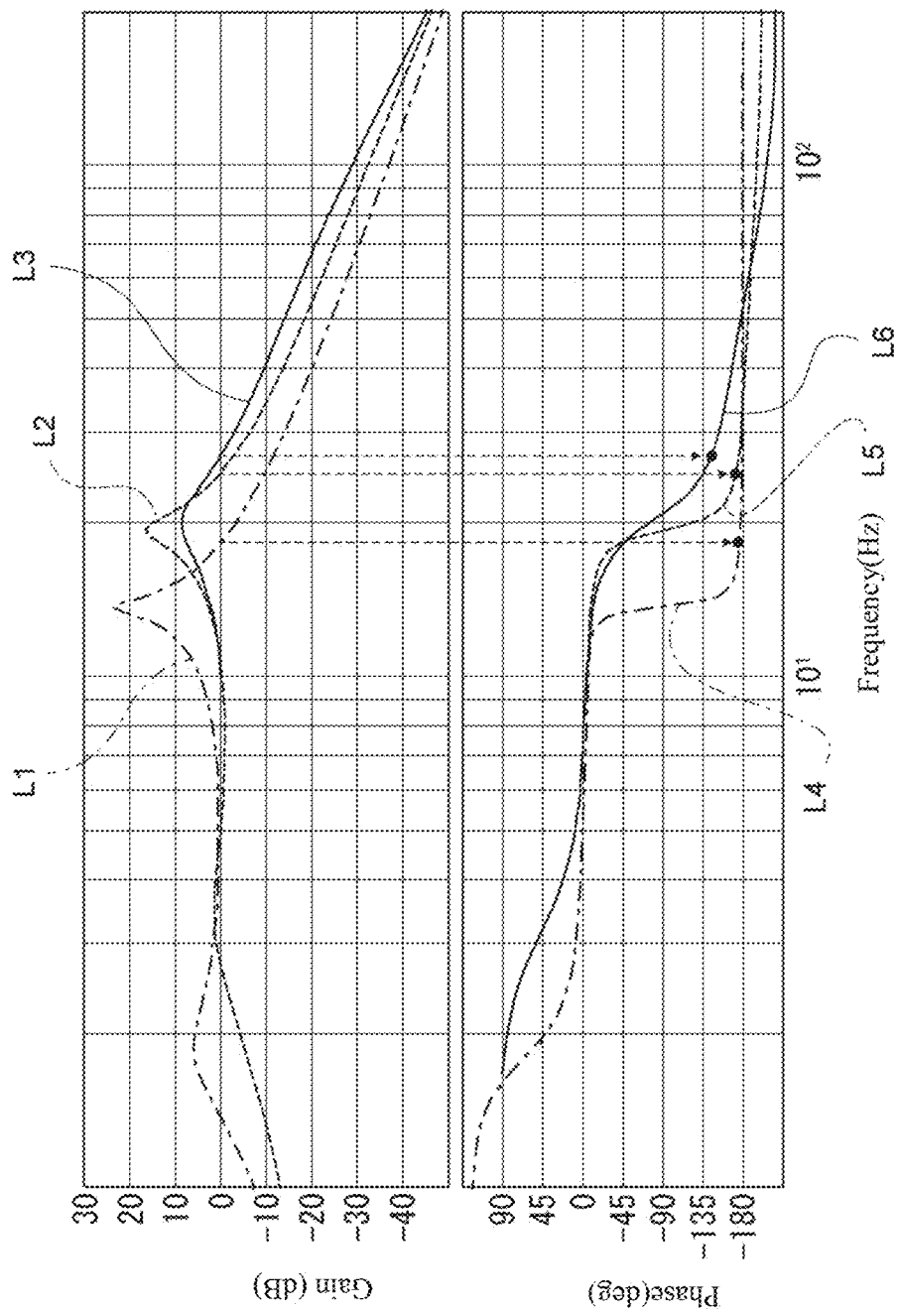
FIG. 3 shows graphs illustrating simulation results.

FIG. 3 shows graphs illustrating simulation results.

FIG. 3 shows the graphs illustrating the simulated results of the steering angle θs as the output generated with respect to the command value input into the motor 10. In an upper part of FIG. 3, a gain of the output with respect to the input is shown, and in a lower part, a value of difference between a phase of an input signal and a phase of an output signal is shown. A horizontal axis of each graph indicates a frequency of the input signal.

Alternate long and short dash lines L1, L4 shown in FIG. 3 represent the simulation results in which only contribution of the first control unit 11 is considered. Broken lines L2, L5 shown in FIG. 3 represent the simulation results in which contribution of the inertia compensation is also considered.

Looking at the gain graph, there is a small resonance point (first resonance point) near 1 Hz and a large resonance point (second resonance point) around a point above 10 Hz in the alternate long and short dash line L1. In the broken line L2, a frequency of the resonance point moves to a high frequency side and a peak of the gain is also reduced. Thus, it turns out that the inertia compensation reduces strength of the resonance.

On the other hand, stability of the system is judged by the phase (a point indicated by a black circle in the figure) at a frequency (broken line arrow in the figure) at which a hem of a resonance peak reaches 0 dB. When this phase is −180 degrees or less, a component that is in antiphase with respect to the input is included, and the system is in an unstable state. Even when the phase of the point indicated by the black circle is close to −180 degrees, there is a possibility that the phase becomes −180 degrees or less in an actual device, and the stability is insufficient.

From this point of view, when looking at the alternate long and short dash line L4 and the broken line L5 in the phase graph, it turns out that the stability is insufficient because the phase of the point indicated by the black circle is close to −180 degrees.

Returning to FIG. 2, the description will be continued.

The phase advance processing unit 124 in the second control unit 12 performs phase advance processing for advancing the phase of a signal waveform on the compensation value obtained by the feedback gain calculation unit 123. A phase lead amount when the phase advance processing is performed in the phase advance processing unit 124 is the phase lead amount depending on the frequency of the signal waveform. Specifically, the phase advance processing unit 124 advances the phase of the signal waveform to be fed back for a partial frequency range that includes a resonance frequency (frequency of the second resonance point) of the steering wheel 911 and the steering mechanism in an entire frequency range. The phase advance processing unit 124 sets a phase lead amount at the above-described second resonance point so that the phase lead amount is larger than a phase lead amount at another frequency. That is, the phase advance processing unit 124 aligns the frequency at which the phase lead amount is maximum with the resonance frequency of the second resonance point. The vehicle speed is also input into the phase advance processing unit 124, so that the phase lead amount is increased or decreased according to the vehicle speed, and the phase advance processing unit 124 advances the phase of the signal waveform with magnitude according to the vehicle speed.

When a signal waveform subjected to such phase advance processing is input into the motor 10, the motor 10 generates the torque component corresponding to viscous resistance with respect to the above-described two-inertia system. Since the viscous resistance is a viscous resistance limited around the resonance frequency of the second resonance point, the efficient viscous damping is obtained.

The effect of such phase advance processing will be described with reference to the graphs of FIG. 3.

Solid lines L3, L6 shown in FIG. 3 represent the simulation results in which the contribution of both the inertia compensation and the phase advance processing by the second control unit 12 is considered.

It turns out from the gain graph that the peak of the gain is further reduced at the solid line L3 compared to the broken line L2. Looking at the solid line L6 in the phase graph, it turns out that the phase of the point indicated by the black circle is sufficiently away from −180 degrees and that the system is stabilized.

In the above description, although an example in which the motor 10 is built into the steering control device 1 is shown, the steering control device of the present disclosure may be a device having only a control side without a built-in motor.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A steering control device for controlling a rotation angle of a motor that drives a steering mechanism according to a rotation angle of a steering wheel, the steering control device comprising:
   a torque controller to control torque of the motor with the rotation angle of the steering wheel as a command value; and
   a phase advance processor to perform feedback control on torque of the steering wheel with at least one of the rotation angle and angular velocity of the motor as a command value, and advance a phase of a signal waveform to be fed back for a partial frequency range that includes a resonance frequency of the steering wheel and the steering mechanism in an entire frequency range; wherein
   the phase advance processor performs feedback control of angular acceleration as the feedback control.

2. The steering control device according to claim 1, wherein the phase advance processor sets a phase lead amount at the resonance frequency so that the phase lead amount is larger than a phase lead amount at another frequency.

3. The steering control device according to claim 1, wherein the phase advance processor advances the phase of the signal waveform with magnitude according to a vehicle speed.

4. A power steering device comprising:
   the steering control device according to claim 1;
   the motor controlled by the steering control device; and
   the steering mechanism driven by the motor.

* * * * *